(12) United States Patent
Alexander et al.

(10) Patent No.: US 9,145,486 B2
(45) Date of Patent: Sep. 29, 2015

(54) FILLED SILICONE COMPOSITIONS, PREPARATIONS AND USES THEREOF

(75) Inventors: Andrea Alexander, Midland, MI (US); Thomas Galbraith, Freeland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 14/237,115

(22) PCT Filed: Jul. 3, 2012

(86) PCT No.: PCT/US2012/045367
§ 371 (c)(1),
(2), (4) Date: Apr. 2, 2014

(87) PCT Pub. No.: WO2013/022532
PCT Pub. Date: Feb. 14, 2013

(65) Prior Publication Data
US 2014/0296433 A1    Oct. 2, 2014

Related U.S. Application Data

(60) Provisional application No. 61/515,563, filed on Aug. 5, 2011.

(51) Int. Cl.
| | | |
|---|---|---|
| *C08G 77/04* | (2006.01) | |
| *C08K 3/36* | (2006.01) | |
| *C08G 77/388* | (2006.01) | |
| *C08L 83/08* | (2006.01) | |
| *C08G 77/16* | (2006.01) | |
| *C08K 5/57* | (2006.01) | |
| *C08K 9/06* | (2006.01) | |

(52) U.S. Cl.
CPC ............... *C08K 3/36* (2013.01); *C08G 77/388* (2013.01); *C08L 83/08* (2013.01); *C08G 77/16* (2013.01); *C08K 5/57* (2013.01); *C08K 9/06* (2013.01)

(58) Field of Classification Search
CPC .............. C08K 3/36; C08K 9/06; C08K 5/57; C08L 83/08; C08G 77/388; C08G 77/16
USPC ........................................ 528/21, 34; 524/860
See application file for complete search history.

(56) References Cited

U.S. PATENT DOCUMENTS

| | | | |
|---|---|---|---|
| 3,189,576 A * | 6/1965 | Sweet | 528/35 |
| 4,503,210 A | 3/1985 | Von Au et al. | |
| 5,359,108 A | 10/1994 | Mathew et al. | |
| 5,405,984 A | 4/1995 | Mathew et al. | |
| 5,534,588 A | 7/1996 | Knepper et al. | |
| 5,569,750 A | 10/1996 | Knepper et al. | |
| 6,545,104 B1 | 4/2003 | Mueller et al. | |
| 2006/0199901 A1 | 9/2006 | Sakamoto | |
| 2008/0300358 A1 | 12/2008 | Cook et al. | |
| 2009/0291238 A1 | 11/2009 | Scott et al. | |
| 2010/0184883 A1 | 7/2010 | Detemmerman et al. | |

FOREIGN PATENT DOCUMENTS

EP    0 342 025 A1    11/1989

OTHER PUBLICATIONS

International Search Report for Application No. PCT/US2012/045367 dated Aug. 10, 2012, 3 pages.

\* cited by examiner

*Primary Examiner* — Kuo-Liang Peng
(74) *Attorney, Agent, or Firm* — Howard & Howard Attorneys PLLC

(57) ABSTRACT

This invention comprises filled silicone compositions initially having a slump of at least 2.5 millimeters when tested described in ASTM D2202-00(2010) except temperature shall be 25 degrees Celsius and time shall be 5 minutes, and a method of preparing and uses of the composition.

17 Claims, No Drawings

FILLED SILICONE COMPOSITIONS, PREPARATIONS AND USES THEREOF

RELATED APPLICATIONS

This application is the National Stage of International Patent Application No. PCT/US2012/045367, filed on Jul. 3, 2012 which claims priority to and all the advantages of U.S. Patent Application No. 61/515,563, filed on Aug. 5, 2011, the content of which is incorporated herein by reference.

This invention comprises filled silicone compositions, preparations and uses.

Silicone based adhesives, coatings, and sealants generally have been useful in a variety of adhering, coating, and sealing applications and adhered, coated, and sealed articles in industries such as automotive, glass, electronics, and building industries.

BRIEF SUMMARY OF THE INVENTION

First, this invention is a first filled silicone composition comprising a mixture of ingredients (A), (B), and (C): (A) endcapping reaction products comprising a silyloxy-endcapped polydiorganosiloxane (SiOE Polymer) and a moisture scavenging effective amount of a first self-catalytic silane (SCS1), which ingredient (A) has been prepared by reaction of a hydroxyl-endblocked polydiorganosiloxane having a kinematic viscosity of from 10,000 Centistokes (cSt) to 100,000 cSt (HOE Polymer) and an endcapping/scavenging effective amount of the SCS1; (B) treating reaction products comprising a silane-treated silica and a moisture scavenging effective amount of a second self-catalytic silane (SCS2), which ingredient (B) has been prepared by reaction of an untreated silica, an activating effective amount of water, and a treating/scavenging effective amount of the SCS2; and (C) a catalytically effective amount of a cure catalyst; wherein ingredients (A) and (B) have been premixed to give a uniform premixture of ingredients (A) and (B), and then ingredient (C) has been added to the uniform premixture of ingredients (A) and (B) so as to prepare the mixture of ingredients (A) to (C); wherein the composition initially has characteristic (a): a slump of ≥2.5 millimeters (mm) when tested as described in ASTM D2202-00(2010) except temperature shall be 25 degrees Celsius (° C.) and time shall be 5 minutes.

Second, this invention is a second filled silicone composition consisting essentially of a mixture of ingredients (A), (B), and (C): (A) a silyloxy-endcapped polydiorganosiloxane (SiOE Polymer) and a moisture scavenging effective amount of a first self-catalytic silane (SCS1); (B) silane-treated silica and a moisture scavenging effective amount of a second self-catalytic silane (SCS2); and (C) a catalytically effective amount of a cure catalyst; wherein the composition has characteristic (a): a slump of ≥2.5 millimeters (mm) when tested as described in ASTM D2202-00(2010) except temperature shall be 25 degrees Celsius (° C.) and time shall be 5 minutes.

Third, this invention is a method of producing the first or second composition, the method comprising: contacting under endcapping effective conditions a hydroxyl-endblocked polydiorganosiloxane having a kinematic viscosity of from 10,000 Centistokes (cSt) to 100,000 cSt (HOE Polymer) with an endcapping/scavenging effective amount of the SCS1 so as to give the ingredient (A); contacting under treating effective conditions an untreated silica with a treating/scavenging effective amount of the SCS2 and an activating effective amount of water ($H_2O$) so as to give the ingredient (B); contacting the ingredient (A) with ingredient (B) so as to give a uniform premixture of ingredients (A) and (B); and contacting the uniform premixture of ingredients (A) and (B) with the cure catalyst ingredient (C) so as to give the first or second composition.

Fourth, this invention is a cured material prepared by curing the first or second composition.

Fifth, this invention is a manufactured article comprising a substrate and the first or second composition or the cured material in operative contact therewith.

Each composition is curable and useful, inter alia, as an adhesive, coating or sealant.

DETAILED DESCRIPTION OF THE INVENTION

The Brief Summary and Abstract are incorporated here by reference. The "consisting essentially of" in the second composition means the second composition lacks an added ingredient that is a fluidizer (i.e., viscosity-reducing additive) having a kinematic viscosity>0 cSt and <10,000 cSt (fluidizer and ingredient (D) are described later).

"May" confers a choice and is in no way an imperative. "2+" means at least two. "Optionally" means is absent, alternatively is present. The "(α,Ω)" means alpha,omega, denoting terminal substitution. Where a standard test method (e.g., an ASTM test method) may provide a choice of two or more ways of testing, unless otherwise indicated herein the first way is chosen. The "contacting" comprises uniformly mixing together. The "on" when used in a sense of tangible objects being physically adjacent refers to being in direct physical contact with. The "operative contact" comprises an adhering, coating, filling, or sealing touching. All "wt %" (weight percent) is, unless otherwise noted, based on total weight of all ingredients used to make each composition, which adds up to 100 wt %. "Treated" is non-covalent or covalent bonding, or any 2+ combination thereof.

The inventors recognized problems with prior art silica filled silicone compositions. Without fluidizer, they rapidly gelled or had a slump <2.0 mm at ambient temperature. This made them unsuitable for narrow joint sealing and/or certain transferring or manufacturing unit operations, coating and adhesive applications requiring higher flowability and/or self-leveling. Further, the fluidizer bled out of or weakened the prior art compositions, or disadvantageously caused them to disadhere, bleed, crack, and/or shrink.

One of the problems solved by this invention is providing alternative silica filled silicone compositions and method of making same that unpredictably can achieve high slump of characteristic (a) at ambient temperature (e.g., 25° C.-27° C.) without a fluidizer. The "fluidizer" is a viscosity-reducing additive, which is a substance distinct from ingredients (A) to (D) that has been added to, and not generated as a by-product in, the first or second composition and that has a kinematic viscosity from >0 to ≤10,000 cSt, alternatively from >0 to ≤1,000 cSt. The serendipitously discovered solution comprises the aforementioned activating effective amount of water, a slight excess of SCS1 in ingredient (A) beyond what is used to endcap the HOE Polymer, and a slight excess of SCS2 in ingredient (B) beyond what is used to prepare the treated silica in each composition, the method being performed in such way so as to achieve the high slump of characteristic (a) without a fluidizer. Slight excesses are the moisture scavenging effective amounts. If ingredient (A) would not initially contain the slight excess of SCS1, a resulting composition without fluidizer typically would not have slump characteristic (a). If the activating effective amount of water is not used (that is, if an anhydrous untreated silica (i.e., 0 wt % water) or substantially dry untreated silica (i.e., <0.50 wt % water) is used without adding the activating effective amount of water to the treating reaction, or if a wet untreated silica (i.e., >3. wt % water, e.g., 3.4 wt %) is used), the treating reaction mixture disadvantageously thickens to the point each composition would lack characteristic (a). If SCS2 is absent, the untreated silica may remain untreated or may be insufficiently treated (to give sufficient slump). The uniform premixture of ingredients (A) and (B) is also expected to have the characteristic (a).

Another solution for achieving characteristic (a) may comprise generating the endcapping reaction products in situ and using them in the treating step for preparing ingredient (B), alternatively generating the treating reaction products in situ and using them in the mixing step for preparing the uniform premixture of ingredients (A) and (B), alternatively both.

Aspects of this invention may independently solve additional problems and have additional advantages. Each composition may also independently have at least one, alternatively at least two, alternatively each of characteristics (b), (c), and (d). Characteristic (b) is an initial light transmission greater than 95% at a thickness of 2.0 millimeters (mm) or less when measured according to ASTM D542-00(2006) (*Standard Test Method for Index of Refraction of Transparent Organic Plastics*), alternatively the light transmission (clarity) is qualitatively greater than that of Dow Corning™ 1199 Silicone Glazing Sealant tested under same conditions. Characteristic (c) is retention of the slump of ≥2.5 mm when tested as for characteristic (a), the retention of slump being after storage of the compositions at 25° C. under an anhydrous/alcohol-free condition for ≥30 days. Slump retention characteristic (c) indicates shelf-life and is determined after the compositions have been stored for ≥30 days, alternatively ≥60 days, alternatively ≥300 days. Characteristic (d) is an absolute cure speed (ASTM C679-03(2009)e1, *Standard Test Method for Tack Free Time of Elastomeric Sealants*) of ≤15 minutes, alternatively a tack-free time (ASTM D2377-00 (2008), *Standard Test Method for Tack Free Time of Caulking Compounds and Sealants*) of ≤30 minutes. Each composition may comprise at least (a) and (b); alternatively at least (a) and (c); alternatively at least (a) and (d); alternatively at least (a), (b), and (c); alternatively at least (a), (b), and (d); alternatively at least (a), (c), and (d); alternatively (a), (b), (c), and (d). The reason the invention achieves characteristic (a), and optionally (b) to (d) is not well understood.

One of the solutions for achieving characteristic (c) is when the endcapping step of the method employs the HOE Polymer without untreated silica and contacts the SCS1 and SCS2 to the HOE Polymer at once. Here the endcapping step may advantageously employ a slump-retaining total wt % of SCS1 and SCS2 of from 0.8 to 3.0 wt %, alternatively within the range a maximum ≤2.9 wt %, alternatively ≤2.0 wt %; and alternatively within the range a minimum ≥1.0 wt %, alternatively ≥1.5 wt %. If >4, or >3, total wt % of SCS1+SCS2 are simultaneously added to HOE Polymer in absence of untreated silica, the composition may or may not initially satisfy slump characteristic (a), but may gradually stiffen and not retain slump (see characteristic (c)) when stored at 25° C. for >7 days, alternatively >60 days, alternatively >300 days. Alternatively achieve (c) by, in the endcapping step, first placing the HOE Polymer in uniform admixture with the untreated silica, then simultaneously contacting the SCS1+SCS2 thereto; alternatively, by, in the treating step, contacting the untreated silica and SCS2 together in the presence of ingredient (A).

Another solution for achieving characteristic (c) may comprise an aspect of the method comprising an effective order of addition for preparing the uniform premixture of ingredients (A) and (B) by a procedure (aa), (bb), (cc), or (dd). Procedure (aa) is (i) contacting the endcapping/scavenging effective amount of the SCS1 with a pretreatment mixture comprising the HOE Polymer, untreated silica, and activating effective amount of $H_2O$ to give a mixture comprising ingredient (A) and untreated silica; and followed by (ii) contacting the treating/scavenging effective amount of the SCS2 with the mixture of (aa)(i) (i.e., with the untreated (or insufficiently treated) silica therein) to give the uniform premixture of ingredients (A) and (B). Procedure (bb) is (i) contacting the endcapping/scavenging effective amount of the SCS1 with the HOE Polymer to give a mixture comprising ingredient (A); followed by (ii) contacting the treating/scavenging effective amount of the SCS2 to the mixture of (bb)(i); followed by (iii) adding the untreated silica and the activating effective amount of $H_2O$ to the mixture of (bb)(ii) to give the uniform premixture of ingredients (A) and (B). Procedure (cc) is (i) contacting the endcapping/scavenging effective amount of the SCS1 with the HOE Polymer to give a mixture comprising ingredient (A); followed by (ii) contacting the untreated silica and the activating effective amount of $H_2O$ to the mixture of (cc)(i); followed by (iii) adding the treating/scavenging effective amount of the SCS2 to the mixture of (cc)(ii) to give the uniform premixture of ingredients (A) and (B). Procedure (dd) is (i) contacting the endcapping/scavenging effective amount of the SCS1 and the treating/scavenging effective amount of the SCS2 with a uniform admixture of the HOE Polymer, the untreated silica, and activating effective amount of $H_2O$ to give the uniform premixture of ingredients (A) and (B). Alternatively, the order of addition may comprise procedure (aa), (bb), or (cc); alternatively (aa), (bb), or (dd); alternatively (aa), (cc), or (dd); alternatively (bb), (cc), or (dd); alternatively (aa) or (bb); alternatively (aa) or (cc); alternatively (aa) or (dd); alternatively (bb) or (cc); alternatively (bb) or (dd); alternatively (cc) or (dd).

Unbound by theory, the method of preparing the composition gives the composition as a product-by-process that beneficially affects structure of at least one of the formed ingredients (e.g., silane-treated silica) such that the composition initially has the characteristic (a): a slump of ≥2.5 millimeters (mm) when tested as described in ASTM D2202-00(2010) except temperature shall be 25 degrees Celsius (° C.) and time shall be 5 minutes. The slump characteristics (a) and (c) are determined according to an American Architectural Manufacturers Association (AAMA) modified test (AAMA 800-05, *Voluntary Specifications and Test Methods for Sealants*, published 2005) for AAMA 803.3 (Type II) Self-Leveling Narrow Joint Seam Sealers, wherein the ASTM D2202-00 (2010) (*Standard Test Method for Slump of Sealants*) method is performed except the temperature shall be 25° C., alternatively 25° C.±3° C., and time shall be 5 minutes, when the distance of slump in millimeters is recorded. For present purposes, any slump ≥2.5 mm in ≤5 minutes at 25° C. passes the AAMA modified test. The AAMA modified test is particularly useful for determining the degree of self-leveling and slump of each composition and its suitability for sealing narrow joints that are mechanically restricted from movement, especially for sealing narrow joints against the infiltration of air, water, or air and water leakage. The narrow joint may have a width of from >0 to ≤5 mm. Each composition may be readily formulated to a desired slump under the circumstances (e.g., for use in vertical or horizontal joints, narrow or wide joints), e.g., by varying surface area or amount of the untreated silica, varying the kinematic viscosity of the HOE Polymer, varying the slump-enabling total wt % of SCS1+SCS2, or any 2+ combination thereof. Each composition may have a maximum slump ≤150 mm, alternatively ≤110 mm, alternatively ≤75 mm, alternatively ≤50 mm; and alternatively a minimum slump ≥3.0 mm, alternatively ≥10 mm, alternatively ≥20 mm, alternatively ≥50 mm, or any 2+ combination thereof. Advantageously, each composition may enable self-leveling and adequate filling of narrow joint in absence of a distinct ingredient that is the fluidizer. This invention also is a method comprising applying the first or second composition to a surface of the substrate, optionally allowing the applied composition to self-level, and then curing the optionally self-leveled composition to give the manufactured article comprising the cured material.

Unexpectedly, characteristic (d) cure speed (ASTM C679-03(2009)e1) and tack-free time (ASTM D2377-00(2008)) of each composition may be advantageously modulated with order of addition. The cure speeds are increased and tack-free times are reduced (desirable for fast cure applications) by a faster aspect of the method comprising endcapping the HOE Polymer before adding the untreated silica as compared to cure speeds and tack-free times of a slower aspect of the method (desirable for slower cure applications) comprising endcapping the HOE Polymer in the presence of, admixture with, the untreated silica. The cure speeds and tack-free times of the faster aspect method may be ≥2 times faster, alternatively ≥3 times faster, alternatively ≥4 times faster, alternatively ≥5 times faster, alternatively ≥7 times faster, alternatively ≥10 times faster; and thus tack-free times respectively may be ≥0% and ≤50% shorter, alternatively ≤33% shorter, alternatively ≤25% shorter, alternatively ≤20% shorter, alternatively ≤14% shorter, alternatively ≤10% shorter; than the cure speeds and tack-free times of the slower aspect method. The cure speed may be an absolute cure speed, a relative cure speed, or both. Cure speed, like tack-free time, is given in minutes, where fewer minutes means higher cure speeds. The absolute cure speed, alternatively tack-free time, may be >0 and ≤40 minutes, alternatively ≤30 minutes, alternatively ≤29 minutes, alternatively ≤10 minutes. For applications desiring faster cure speeds and reduced tack-free times, the method advantageously employs the faster aspect method comprising the procedure (bb) or (cc), alternatively (bb), alternatively (cc). For applications desiring slower relative and absolute cure speeds and tack-free times, the method advantageously employs the slower aspect method comprising the procedure (aa) or (dd), alternatively (aa), alternatively (dd).

Ingredient (A) comprises the SiOE Polymer and the moisture scavenging effective amount of SCS1 (unreacted SCS1 or in situ intermediate therefrom), and may further include one or more endcapping reaction by-products. The SiOE Polymer may be unblended or a blend of two or more different SiOE Polymers. The SiOE Polymer comprises, alternatively consists of, two silyl endcapped oxygen atom radicals covalently bonded to different terminal silicon atoms of the polydiorganosiloxane. The "silyl" means a monovalent silicon atom bonded to carbon atoms of 3 same or different monovalent carbon atom containing groups, e.g., (($C_1$-$C_6$)heterohydrocarbyl)$_3$SiO— or (($C_1$-$C_6$)hydrocarbyl)$_3$SiO—, e.g., ($C_1$-$C_4$alkyl)$_3$SiO—. The SiOE Polymer may be prepared from any one of the HOE Polymers described later, e.g., the SiOE Polymer may be a silyloxy-endblocked polydialkylsiloxane, e.g., having terminal endblocking groups (($C_1$-$C_6$)heterohydrocarbyl)$_3$SiO— or (($C_1$-$C_6$)hydrocarbyl)$_3$SiO—, e.g., ($C_1$-$C_4$alkyl)$_3$SiO—.

The SiOE Polymer may be prepared by contacting together under the endcapping effective conditions the endcapping/scavenging effective amount of SCS1 and HOE Polymer. The endcapping effective conditions include the reaction temperature and times described later and may include an anhydrous atmosphere (e.g., an anhydrous inert gas or dried air). The endcapping reaction substantially endcaps, the hydroxyl groups of the HOE Polymer with the SCS1 such that the SiOE Polymer is produced. The SiOE Polymer has, on average, ≥1.9, alternatively ≥1.95, alternatively ≥1.98, alternatively 2.0 silyl endcapped oxygen atom radicals (endcapped hydroxyl moieties) per molecule thereof.

Ingredient (B) comprises the silane-treated silica (treated silica) and the moisture scavenging effective amount of SCS2 (unreacted SCS2 or in situ intermediate therefrom), and may further include one or more treating, and optionally endcapping, reaction by-products. The treated silica may be prepared by contacting together under the treating effective conditions the treating/scavenging effective amount of SCS2, activating effective amount of water, and untreated silica. The treating effective conditions may include the reaction temperature and times described later and an anhydrous atmosphere (e.g., an anhydrous inert gas or dried air).

The kinematic viscosity of the HOE Polymer may be determined according to test method ASTM-D445-11a (*Standard Test Method for Kinematic Viscosity of Transparent and Opaque Liquids (and Calculation of Dynamic Viscosity)*), e.g., at 25° C. Within the aforementioned range, the maximum kinematic viscosity may be ≤80,000 cSt, alternatively ≤60,000 cSt, alternatively ≤55,000 cSt, alternatively ≤42,000 cSt, alternatively ≤30,000 cSt, alternatively ≤20,000 cSt. Within the aforementioned range, the minimum kinematic viscosity may be ≥11,000 cSt, alternatively ≥12,000 cSt, alternatively ≥15,000 cSt, alternatively ≥20,000 cSt. The kinematic viscosity may be from 100,000 cSt to 80,000 cSt, alternatively from 80,000 to 60,000 cSt, alternatively from 60,000 cSt to 40,000 cSt (e.g., from 55,000 cSt to 42,000 cSt), alternatively from 40,000 cSt to 20,000 cSt, alternatively from 20,000 cSt to 10,000 cSt (e.g., from 19,000 cSt to 12,000 cSt). The HOE Polymer may be unblended or a blend of two or more different HOE Polymers. The HOE Polymer comprises, alternatively consists of, two HO— groups covalently bonded to different terminal silicon atoms of the polydiorganosiloxane. Other than their terminal groups, the polydiorganosiloxane of the SiOE Polymer may be the same as the polydiorganosiloxane of the HOE Polymer (the endcapping, treating, or both reactions may chemically modify the polydiorganosiloxane). The polydiorganosiloxane may be acyclic; alternatively cyclic; alternatively acyclic and branched; alternatively acyclic and linear (straight chain). Excluding their ($\alpha,\Omega$)-terminal groups, the polydiorganosiloxane independently may be a polydi($C_1$-$C_7$)hydrocarbyl)siloxane wherein each ($C_1$-$C_7$)hydrocarbyl independently is same or different. The polydi($C_1$-$C_7$)hydrocarbyl)siloxane may be a difunctional (D) siloxane unit represented as $R_2SiO_{2/2}$, wherein each R independently is the ($C_1$-$C_7$)hydrocarbyl. At least one organo (i.e., one or more of the ($C_1$-$C_7$)hydrocarbyl (R) groups) of the polydiorganosiloxane may be substituted with fluoro (e.g., fluoromethyl or fluorophenyl); alternatively, each organo may be unsubstituted. Each unsubstituted organo independently may be an unsubstituted ($C_1$-$C_7$)alkyl, unsubstituted ($C_2$-$C_7$)alkenyl (e.g., vinyl or allyl), unsubstituted ($C_3$-$C_7$)cycloalkyl (e.g., cyclopropyl), unsubstituted phenyl, or unsubstituted benzyl. The polydi($C_1$-$C_7$)hydrocarbyl)siloxane may be a polydi($C_1$-$C_7$)alkylsiloxane, alternatively a polydi(($C_5$-$C_7$)alkyl)siloxane, alternatively a polydi($C_1$-$C_4$)alkylsiloxane, alternatively a polydi(($C_1$-$C_3$)alkyl)siloxane, alternatively a polydi(($C_1$-$C_2$)alkyl)siloxane, alternatively a polydiethylsiloxane, alternatively a poly(ethyl,methyl)siloxane, alternatively a polydimethylsiloxane. The polydiorganosiloxane may, alternatively may not, have ≤5 wt %, alternatively ≤1 wt % T, Q, or T and Q units as long as the T and/or Q units do not eliminate the novel and inventive characteristics of this invention.

The HOE Polymer may be prepared by methods known in the art, such as hydrolysis and condensation of the corresponding dialkylhalosilanes or equilibration of cyclic polydiorganosiloxanes (e.g., cyclic polydialkylsiloxanes). Alternatively, the HOE Polymer may be prepared by a preliminary hydrolysis of a hydrolyzable organic group-endcapped hydroxyl-endblocked polydiorganosiloxane, wherein the hydrolyzable organic group is cleaved by a minimal amount of moisture (water) effective therefor. Suitable HOE Polymers are known in the art and are commercially available (e.g., from Dow Corning Corporation, Midland, Mich., USA; or Gelest, Inc., Morrisville, Pa., USA). The amount of the HOE Polymer employed in the method and used to make the compositions may be from 50 to 95 wt %, alternatively from 60 to 90 wt %, alternatively from 70 to 90 wt % (e.g., 71 to 86 wt %), alternatively from 80 to 90 wt % (e.g., 84 to 86 wt %), or any 2+ combination thereof.

The SCS1 and SCS2 may be the same, alternatively different. Each of the SCS1 and SCS2 independently is a molecule having either a silicon atom (Si) directly bonded to 1 hydrocarbyl (e.g., alkyl or alkenyl) and 3 hydrolyzable groups; alternatively Si directly bonded to 1 heterohydrocarbyl (a monovalent compound comprising carbon(s), hydrogen(s), and at least one heteroatom N, O, S, or P and bonded via one of the carbon(s) to the Si, e.g., 3-dimethylaminopropyl) and 3 hydrolyzable groups; alternatively Si directly bonded to 4 hydrolyzable groups. Each hydrolyzable (off of Si) group independently is reactive with or displaceable by water under the endcapping or treating effective conditions. Each hydrolyzable group of the SCS1 and SCS2 independently may be a: halogen atom, methylacetamido, acetamido, acyloxy, alkoxy, amido, amino, aminoxy, hydroxyl, oximo, or ketoximo. The halogen atom may be chloro; the acyloxy may be acetoxy; the alkoxy may be methoxy, ethoxy, methyl lactate-based alkoxy (e.g., $CH_3O_2CC(H)(CH_3)O—$), or ethyl lactate-based alkoxy (e.g., ethyl (L)-lactate-based alkoxy); the amido may be carboxylic-based, e.g., acetamido; the oximo may be $CH_2NO—$ or $CH_3CHNO—$; and the ketoximo may be $(C_1-C_3 alkyl)_2CNO—$ (e.g., $(CH_3)_2CNO—$, $(CH_3CH_2)CH_3CNO—$, or $(CH_3CH_2)_2CNO—$). Each hydrolyzable group may be the ethyl lactate-based alkoxy, alternatively the oximo, alternatively the ketoximo. The amino moiety(ies) may be primary-amino ($H_2N—$), secondary-amino (e.g., $CH_3HN—$ and $CH_3CH_2HN—$), or tertiary-amino primary (e.g., $(CH_3)_2N—$ and $CH_3CH_2(CH_3)N—$); alternatively primary-amino; alternatively secondary-amino. The amino moiety(ies) may lack a quaternary amino moiety. The amino moiety(ies) independently may be bonded via 0 to 5 carbon atoms, alternatively 0 carbon atom, alternatively from 1 to 5 carbon atoms to a silicon atom in the SCS1 or SCS2 (e.g., (amino moiety)-Si, (amino moiety)-C—Si, (amino moiety)-C—C—Si, (amino moiety)-C—C—C—Si, (amino moiety)-C—C—C—C—Si, or (amino moiety)-C—C—C—C—C—Si). Each of SCS1 and SCS2 may have a formula, or weight average if appropriate, molecular weight <500 g/mol, alternatively <400 g/mol.

SCS1 and SCS2 with appropriate reactivities under the circumstances may be chosen. For the SCS1 used to endcap the HOE Polymer in a homogeneous mixture of the HOE Polymer and any untreated silica or SCS2, it may be desirable to chose a SCS1 that is more reactive with the terminal hydroxyl groups of HOE Polymer than with the untreated silica or a SCS1 that is more reactive with the terminal hydroxyl groups of the HOE Polymer than the SCS2 is reactive therewith, respectively, or both. Examples of such more reactive SCS1s are vinyl tri(ketoximino)silanes, tetra(ketoximino)silanes, and mixtures thereof. If the SCS1 is slower reacting with the terminal hydroxyl groups than is the SCS2, the SCS1 may be added and allowed to completely react with the HOE Polymer before the SCS2 is added.

The endcapping/scavenging effective amount of SCS1 is a quantity sufficient for both endcapping the HOE Polymer and, after endcapping, scavenging any moisture that may enter the composition. The slight excess of SCS1 to HOE Polymer may vary depending on the mole equivalent of reactive functional groups in the tri- or tetra-functional SCS1. The HOE Polymer typically has an average of 2 moles of HO— groups per molecule of per hydroxyl group. The average number of hydroxyls to be endcapped may be readily determined based on number average molecular weight ($M_n$) of the HOE Polymer, with $M_n$ determined by gel permeation chromatography or by known correlations of kinematic viscosity of a particular HOE Polymer to its $M_n$. Endcapping progress may be monitored by nuclear magnetic resonance (NMR) spectroscopy (e.g., $^1$H-NMR or $^{13}$C-NMR), Fourier transform-infrared spectroscopy (FT-IR), or titration of hydroxyls with iodine monochloride. The endcapping/scavenging effective amount of the SCS1 may be moles of SCS1 to moles of hydroxyl groups of the HOE Polymer of from 1.01 to 2.0, alternatively in this range a maximum ≤1.9, alternatively ≤1.7; and alternatively in this range a minimum ≥1.05, alternatively ≥1.1, alternatively ≥1.2. Alternatively, the endcapping/scavenging effective amount of SCS1 per 100 wt % of the each composition is from 0.75 to 7 wt %, alternatively in this range a maximum ≤5 wt %, alternatively ≤3 wt %, alternatively ≤2 wt %; and alternatively in this range a minimum ≥0.90 wt %; alternatively ≥1 wt %, including any 2+ combination thereof. Alternatively, the scavenging effective amount (slight excess) of SCS1 carried into ingredient (A) may be from >0 wt % to ≤3 wt %, alternatively >0 wt % to ≤2 wt %, alternatively >0 wt % to ≤1 wt %, alternatively >0 wt % to ≤0.9 wt %, or any combination thereof. It is okay that the slight excess of SCS1 may not carry through to each composition if it is used up in the treating step. Some SCS1 may survive the treating reaction and may be found in the compositions. Any surviving portion (residual portion) of the endcapping/scavenging effective amount of SCS1 may comprise or be the moisture scavenging effective amount of SCS1. Alternatively, the moisture scavenging effective amount of SCS1 may be added separately to the compositions.

The treating/scavenging effective amount of SCS2 is a quantity sufficient for both treating the silica and, after treating, scavenging any moisture that may enter the compositions. This amount may be from >0 wt % to 5 wt %, alternatively from 2 to 4 wt %, of SCS2. After ingredient (B) is formed, the slight excess of SCS2 remaining for moisture scavenging may be from >0 wt % to 3 wt %, alternatively ≤2 wt %, alternatively ≤1 wt %, alternatively ≤0.5 wt %, alternatively ≤0.2 wt %. Alternatively, the treating/scavenging effective amount of SCS2 may be from 1 to 5 wt %, alternatively from 2 to 4 wt %, alternatively from 2.1 to 3.5 wt %; alternatively any combination of ≤ and ≥(e.g., from 2.0 to 3.9 wt %), including any 2+ combination thereof. Some SCS2 may survive the treating reaction and may be found in the compositions. The surviving portion (residual portion) of the treating/scavenging effective amount of SCS2 may comprise or be the moisture scavenging effective amount of SCS2. At least some SCS1, SCS2, or both SCS1 and SCS2 may survive the treating reaction and may be found in the compositions.

Certain SCS1 and SCS2 may be particularly useful. The SCS1 may be a ($C_2-C_4$)alkenyl tri(ketoximino)silane, tetra(ketoximino)silane, or a mixture thereof; and the SCS2 may be a ($C_2-C_4$)alkenyl tri(ketoximino)silane, tetra(ketoximino) silane, alkyltri(ketoximino)silane, alkyltri(alkyllactate)silane, $(C_2-C_4)$alkenyl tri(alkyllactate)silane, tetra(alkyllactate)silane, or a mixture of any two or more thereof; wherein each ketoximino is based on a dimethylketone, methyl ethyl ketone, or diethylketone. The $(C_2-C_4)$alkenyl may be 4-butenyl, 1-butenyl, allyl, or vinyl; alternatively allyl; alternatively vinyl. The SCS1 may be vinyl tri(ketoximino)silane, alternatively tetra(ketoximino)silane, alternatively a mixture thereof. The SCS2 may be a vinyl tri(ketoximino)silane, alternatively tetra(ketoximino)silane, alternatively alkyltri (ketoximino)silane, alternatively alkyltri(alkyllactate)silane, alternatively vinyl tri(alkyllactate)silane, alternatively tetra (alkyllactate)silane, alternatively a mixture of any two or more thereof. Each ketoximino may be based on a dimethylketone, alternatively methyl ethyl ketone, alternatively diethylketone. The SCS1 may be vinyl tri(methylethylketoximino)silane, vinyl tri(dimethylketoximino)silane, vinyl tri (diethylketoximino)silane, tetra(methylethylketoximino)silane, or a mixture of any two or more thereof. The SCS2 may be vinyl tri(methylethylketoximino)silane, vinyl tri(dimethylketoximino)silane, vinyl tri(diethylketoximino)silane, tetra (methylethylketoximino) silane, methyltri(methylethylketoximino)silane, methyltri(dimethylketoximino)silane, methyltri(diethylketoximino)silane, ethyltri(methylethylketoximino)silane, ethyltri(dimethylketoximino)silane, ethyltri (diethylketoximino)silane, methyltri(ethyllactate)silane, vinyl tri(ethyllactate)silane, tetra(ethyllactate)silane, or any 2+ mixture thereof. Suitable SCS1 and SCS2 are known in the art and are commercially available (e.g., from Dow Corning Corporation or Gelest, Inc.) or can be readily prepared by methods known in the art such as reacting a conjugate acid form of the hydrolyzable group with a hydrocarbyltrichlorosilane or tetrachlorosilane.

The activating effective amount of water may be given relative to the amount of untreated silica and may be from 0.55 wt % to <2.9 wt %, alternatively in this range a minimum ≥0.64 wt %, alternatively ≥0.80 wt %, alternatively ≥1.00 wt %; and alternatively in this range a maximum ≤2.0 wt %, alternatively ≤1.8 wt %, alternatively ≤1.6 wt %; alternatively a range from 0.70 wt % to <1.9 wt %, alternatively from 0.8 wt % to ≤1.6 wt %, alternatively from 1.0 wt % to ≤1.6 wt %, alternatively from 0.8 wt % to ≤1.2 wt %, all based on total weight of the untreated silica and water. The water may be added as an ingredient separate from the untreated silica, alternatively as a reversibly-adsorbed water (free water) on the untreated silica, alternatively from a separate ingredient that is a water release agent, alternatively any combination thereof. Thus, the activating effective amount of water is the sum of amount of free water, if any, on the untreated silica and amount of water added as liquid water, if any, in the treating reaction mixture. E.g., using 10 g of an untreated silica containing 0.10 g free water has 0.10 wt % free water and may the same as using 9.90 g anhydrous untreated silica and 0.10 g liquid water. The water may be added prior to, alternatively after preparing ingredient (A). A combination of anhydrous and hydrous untreated silicas may be employed so long as the total free water in the hydrous untreated silica, and thus in the treating reaction mixture, is the activating effective amount. Free water content of the untreated silica may be determined according to ASTM-D280-01(2007) (*Standard Test Methods for Hygroscopic Moisture (and Other Matter Volatile Under the Test Conditions) in Pigments*) using a commercial gravimetric moisture analyzer, wherein generally the untreated silica is heated up to 110° C. until weight loss stabilizes and a weight difference is calculated that is used to determine amount of free water lost from the untreated silica. The water may be unpurified, alternatively purified water (e.g., tap, deionized, or distilled water).

The untreated silica may be a particulate silicon dioxide compound having a surface area of from 50 square meters per gram ($m^2/g$) to 600 $m^2/g$, alternatively in this range a maximum ≤400 $m^2/g$, alternatively ≤200 $m^2/g$; and alternatively in this range a minimum ≥80 $m^2/g$, alternatively ≥100 $m^2/g$. The untreated silica may have a bulk density of from 30 to 150 kilograms per cubic meter ($kg/m^3$), alternatively from 40 to 140 $kg/m^3$, alternatively from 50 to 120 $kg/m^3$. The surface area and bulk density may be determined according to ASTM C1240-11 (*Standard Specification for Silica Fume Used in Cementitious Mixtures*). The untreated silica may have at 20° C. a density of 2.1 to 2.3 grams per cubic centimeter ($g/cm^3$), alternatively 2.2 $g/cm^3$. The untreated silica may have a potential of hydrogen (pH) value as determined by ASTM D6739-11 (*Standard Test Method for Silica pH Value*). The pH of the untreated silica may be from pH 3.6 to pH 4.5, alternatively from pH 3.7 to pH 4.4, alternatively from pH 3.8 to pH 4.3. The untreated silica may have a combination of the surface area, bulk density, density, and pH. The untreated silica may be in an anhydrous form (so long as the activating effective amount of water is added separately), alternatively a hydrous form having the activating effective amount of water as described previously. Untreated silica having more than the activating effective amount of water adsorbed thereon may be used if it is first sufficiently dried, e.g., in an oven or vacuum oven. The form of the untreated silica may be a fumed silica (also known as pyrogenic silica), alternatively silica aerogel, alternatively silica xerogel, alternatively precipitated silica. The untreated silica may be the fumed silica, e.g., Synthetic Amorphous, Pyrogenic Silica (CAS 112945-52-5). Suitable untreated silicas are known in the art and commercially available; e.g., CAB-O-SIL fumed silica by Cabot Corporation of Billerica, Mass., U.S.A. E.g., CAB-O-SIL Fumed Silica L-50, L-60, L-90, LM-130, LM-150, M-5, M-5K, PTG, MS-55, H-5, H-7D, HS-5, EH-5, LM-130D, LM-150D, M-7D, MS-75D, S-17D, HP-60, M-8D, EL-1000, EL-2000, MS-35, H300, EL-90, and EL-100. The amount of untreated silica plus activating effective amount of water employed in the method and used to make each composition may be from 1 to 20 wt %, alternatively in this range a maximum ≤15 wt %, alternatively ≤12 wt %, alternatively ≤11 wt %; and alternatively in this range a minimum ≥4 wt %, alternatively ≥5 wt %, alternatively ≥6 wt %, alternatively ≥8 wt %; alternatively any 2+ combination thereof.

Ingredient (C) is the cure catalyst. The cure catalyst may be any suitable substance that is effective for promoting crosslinking (e.g., increasing cure speed or shortening tack-free time) of the condensation-curable polyorganosiloxane compositions. The cure catalyst can be employed in each composition in any suitable catalytically effective amount. The catalytically effective amount may be from ≥0.001 wt % to 5 wt %, alternatively in this range a minimum ≥0.05 wt %, alternatively ≥0.10 wt %, alternatively ≥0.15 wt %; and alternatively in this range a maximum ≤2 wt %, alternatively ≤1 wt %, alternatively ≤0.50 wt %, alternatively ≤0.20 wt %; alternatively any 2+ combination thereof. The cure catalyst may comprise a carboxylic acid salt of a metal, a tin compound, a titanium compound, or a zirconium compound. The metal of the carboxylic acid salt may be any one from lead to manganese inclusive, in the electromotive series of metals. Alternatively, ingredient (C) may comprise a chelated titanium compound, a titanate such as a tetraalkoxytitanate, or a combination thereof. Ingredient (C) may comprise a tin compound such as dimethyltin dineodecanoate, dibutyltin diacetate, dibutyltin dilaurate, dibutyl tin oxide, stannous octanoate tin oxide, or any 2+ combination thereof. Examples of suitable catalysts are disclosed in U.S. Pat. Nos. 4,962,076;

5,051,455; and 5,053,442. Suitable cure catalysts are commercially available (e.g., from Sigma-Aldrich Company, St. Louis, Mo.; Momentive, Columbus, Ohio; or Gelest, Inc., Morrisville, Pa., all of USA) or can be readily prepared by methods known in the art.

The uniform premixture of ingredients (A) and (B) is formed before being contacted with ingredient (C). The first composition may further comprise, and the second composition may further consist essentially of, ingredient (D): an adhesion promoter and each such composition may be characterized by the characteristic (a). Alternatively, each composition may consist of ingredients (A) to (C), alternatively (A) to (D).

Ingredient (D) is the adhesion promoter, a type of surface modifier which may improve characteristic (d) and may not prevent achieving at least one of characteristics (a) to (c). Ingredient (D), when present, may be added to each composition before or simultaneously with adding the catalyst (ingredient (C)) thereto and may be added in an amount ranging from 0.01 to 50 weight wt %, alternatively 0.1 to 5 wt %, alternatively 0.40 to 3 wt %, alternatively any 2+ combination thereof. Suitable adhesion promoters may comprise a transition metal chelate, a hydrocarbonoxysilane such as an alkoxysilane, a combination of an alkoxysilane and a hydroxy-functional polydiorganosiloxane, an aminofunctional silane, an unsaturated or epoxy-functional compound, an unsaturated or epoxy-functional alkoxysilane, or a combination thereof. Suitable transition metal chelates may be titanates, zirconates such as zirconium acetylacetonate, aluminum chelates such as aluminum acetylacetonate, and any 2+ combination thereof. Suitable epoxy-functional alkoxysilanes may be 3-glycidoxypropyltrimethoxysilane, 3-glycidoxypropyltriethoxysilane, (epoxycyclohexyl)ethyldimethoxysilane, (epoxycyclohexyl)ethyldiethoxysilane and any 2+ combination thereof. Suitable unsaturated alkoxysilanes may be vinyl trimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and any 2+ combination thereof. The adhesion promoter may be the aminofunctional silane. The amino moiety(ies) may be primary-amino ($H_2N—$), secondary-amino (e.g., $CH_3HN—$ and $CH_3CH_2HN—$), or tertiary-amino primary (e.g., $(CH_3)_2N—$ and $CH_3CH_2(CH_3)N—$); alternatively primary-amino; alternatively secondary-amino. The amino moiety(ies) may lack a quaternary amino moiety. Suitable aminofunctional silanes may be $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and any 2+ combination thereof. Ingredient (D) may be ethylenediaminoproplytrimethoxysilane, alternatively gamma-aminopropyltriethyoxy silane, alternatively glycidoxypropyltrimethoxy silane, alternatively a mixture of gamma-aminopropyltriethyoxy silane, glycidoxypropyltrimethoxy silane, and methyl trimethoxy silane, alternatively methacryloxypropyltrimethoxysilane.

The uniform premixture is contacted and mixed with ingredient (C) to give fundamental forms of the compositions. Ingredient (D) may be added to the uniform premixture of ingredients (A) and (B) before or simultaneously with adding ingredient (C). The first composition may further comprise, in addition to ingredients (A) to (C), alternatively (A) to (D), at least one of ingredients (E) to (T). The second composition may further consist essentially of, in addition to ingredients (A) to (C), alternatively (A) to (D), at least one of ingredients (F) to (Q) and (T). Ingredients (E) to (T): (E) an extender or plasticizer; (F) a filler such as (f1) a reinforcing filler, (f2) an extending filler, (f3) a conductive filler (e.g., electrically conductive, thermally conductive, or both); (G) a drying agent; (H) a biocide; (I) a heat stabilizer; (J) a flame retardant; (K) a surface modifier other than the adhesion promoter; (L) a chain lengthener; (M) a filler treating agent other than the SCS; (N) a nonreactive binder; (O) an anti-aging additive; (P) a pigment; (Q) a water release agent (which would provide the activating effective amount of water); (R) a rheological additive; (S) a dispersant; (T) a tackifying agent; and a combination thereof. The additional ingredients (F) to (T) are distinct from one another and from ingredients (A) to (D) and are generally known in the art to be compatible with condensation curing of the compositions. When at least one of ingredients (E) to (T) (e.g., (F) to (Q) and (T)) is present, the composition may, alternatively may not, satisfy characteristic (a), alternatively (a) and at least one of (b) to (d). There may be overlap between types or functions of ingredients because certain ingredients described herein may have more than one function. The amounts of ingredients (E) to (T) may be varied under the circumstances, and typically may be from 1 to 20 wt % of the relevant composition. Ingredients (E), (R), and (S) in the first composition may have a kinematic viscosity≥the kinematic viscosity of the HOE Polymer. The first composition may further comprise the fluidizer at a concentration of from 5 to 15 wt %. The fluidizer may be a polydimethylsiloxane fluid having a kinematic viscosity of from 100 cSt to 1000 cSt (e.g., Dow Corning™ 200 fluid having kinematic viscosity of 1000 cSt). Alternatively other than ingredients (A) to (D), the first composition may lack, and the second composition lacks, the fluidizer or added viscosity-reducing additive having a kinematic viscosity>0 cSt and <10,000 cSt, e.g., lacks the extender or plasticizer, rheological additive, or dispersant of ingredients (E), (R), and (S).

Each of the filled silicone compositions independently may be a filled silicone composition has been prepared starting from ingredients that consist essentially of the unreacted HOE Polymer, SCS1, SCS2, untreated fumed silica having the activating effective amount of water, adhesion promoter, catalyst, and optionally a fluidizer. For convenient, this composition embodiment is called herein, Embodiment X. Here the "consist essentially of" means contains <2 wt %, alternatively <1 wt %, alternatively <0.5 wt %, alternatively <0.10 wt % (e.g., 0 wt %) of any other added ingredient. The wt % are all based on total weight of the filled silicone composition of Embodiment X.

The unreacted HOE Polymer used to prepare Embodiment X may be a (α,Ω)-dihydroxy-polydimethylsiloxane having a kinematic viscosity of 11,000 cSt to 59,000 cSt, alternatively from 12,000 cSt to 56,000 cSt, alternatively from 12,500 cSt to 55,000 cSt (e.g., 12,500 cSt ((α,Ω)-DH-PDMS$^{12}$), alternatively 55,000 cSt ((α,Ω)-DH-PDMS$^{55}$)). Alternatively the unreacted HOE Polymer used to prepare Embodiment X may be a (α,Ω)-dihydroxy-polydiethylsiloxane having a kinematic viscosity of from 40,100 cSt to 45,000 cSt (e.g., 42,000 cSt ((α,Ω)-DH-PDES$^{42}$)). The amount of unreacted HOE Polymer used to prepare Embodiment X may be from 81 wt % to 89 wt %, alternatively from 82 wt % to 88 wt %, alternatively from 82.4 wt % to 87.6 wt %. The wt % are all based on total weight of the filled silicone composition of Embodiment X.

The SCS1 used to prepare Embodiment X may be VOS of from 1.05 to 1.95 wt %, alternatively from 1.4 wt % to 1.75 wt %, alternatively from 1.59 wt % to 1.69 wt %. Alternatively, the SCS1 may be a 4:1 wt/wt mixture of VOS/TOS of from 1.60 wt % to 1.69 wt %. Alternatively the SCS1 may be a 1:1 wt/wt mixture of MT15/VOS of from 1.55 wt % to 1.65 wt %. The wt % are all based on total weight of the filled silicone composition of Embodiment X.

The SCS2 used to prepare Embodiment X may be MOS of from 2.01 wt % to 3.80 wt %, alternatively from 2.10 wt % to 3.70 wt %, alternatively from 2.15 wt % to 3.29 wt %, Alternatively, the SCS2 may be MT15 of from 3.1 wt % to 3.4 wt %, alternatively from 3.21 wt % to 3.29 wt %. Alternatively the SCS2 may be a 4:1 wt/wt mixture of MOS/VOS of from 2.6 wt % to 2.8 wt %, alternatively from 2.7 wt % to 2.8 wt %, alternatively from 2.71 wt % to 2.79 wt %. The wt % are all based on total weight of the filled silicone composition of Embodiment X.

Alternatively, the SCS1 and SCS2 used to prepare Embodiment X may be a mixture of VOS and MOS of from 1:1 wt/wt to 1.5 wt/wt of from 2.5 wt % to 5.5 wt %, alternatively from 2.8 wt % to 5.3 wt %, alternatively from 2.88 wt % to 5.25 wt %. The wt % are all based on total weight of the filled silicone composition of Embodiment X.

The untreated fumed silica having the activating effective amount of water used to prepare Embodiment X may have a surface area of from 80 m$^2$/g to 220 m$^2$/g, alternatively from 85 m$^2$/g to 210 m$^2$/g, alternatively from 90 m$^2$/g to 201 m$^2$/g; and a free water content of from 1.01 wt % to 2.20 wt %, alternatively from 1.10 wt % to 2.10 wt %, alternatively from 1.16 wt % to 2.07 wt % free water. The wt % are all based on total weight of the untreated fumed silica.

The optional fluidizer, when used to prepare Embodiment X, may be the polydimethylsiloxane fluid having a kinematic viscosity of from 100 cSt to 1000 cSt, alternatively from 150 cSt to 500 cSt, alternatively from 175 cSt to 300 cSt (e.g., 200 cSt); and a concentration of from >0 wt % to 20 wt %, alternatively from 11 wt % to 17 wt %, alternatively from 14 wt % to 16 wt %. The wt % are all based on total weight of the filled silicone composition of Embodiment X.

Alternatively, the filled silicone composition of Embodiment X may be any one of the flowable compositions of Examples 1 to 30 described later.

In the method the endcapping reaction mixture may or may not contain a residual amount of unreacted HOE Polymer.

The endcapping and treating reactions may proceed for similar or different periods of time, which may depend on reaction time, reaction temperature, or mixing efficiency, or any two or all thereof. The reaction time, reaction temperature, and mixing efficiency are adequate for preparing the compositions having the aforementioned slump. For example, the mixing efficiency or effectiveness during the treating reaction is sufficient to generate enough shear stress to de-agglomerate any agglomerated silica particles, and thereby produce intimate physical contact between de-agglomerated silica particles and the treating/scavenging effective amount of the SCS2 and the activating effective amount of water. Extent of (de-)agglomeration of silica particles may be determined by measuring particle size such as with a single particle optical sensing system such as an ACCUSIZER Model 780 APS instrument (Particle Sizing Systems, Port Richey, Fla., USA). Alternatively or additionally, the mixing efficiency may be determined by measuring shear rate during mixing such as with a DV-III Ultra rheometer instrument (Brookfield Engineering Laboratories, Middleboro, Mass., USA). If desired a few runs may be performed under particular conditions/ingredients and with a particular mixer at different mixing speeds (e.g., 1×, 5×, 10×), and an acceptable mixing speed may be readily selected from the results for the particular conditions/ingredients employed. When the treating reaction temperature is ambient temperature (e.g., 25° C.), in some embodiments an adequate shear rate is ≥1,000 per second (sec$^{-1}$), alternatively ≥2,000 sec$^{-1}$, alternatively ≥2,500 sec$^{-1}$, alternatively ≥5,000 sec$^{-1}$. An upper limit to the shear rate may be 20,000 sec$^{-1}$, alternatively 10,000 sec$^{-1}$, alternatively ≤8,000 sec$^{-1}$, alternatively ≤5,000 sec$^{-1}$. Super-ambient treating reaction temperatures may allow lower shear rates to be used, and sub-ambient reaction temperatures may allow higher shear rates to be used. Alternatively, mixer speed, expressed in revolutions per minute (rpm), may be used as a proxy for shear rate, wherein higher mixer speeds give higher shear rates. When the treating reaction temperature is ambient temperature, a mixer speed of ≥30 rpm, alternatively ≥35 rpm, alternatively ≥50 rpm, alternatively ≥70 rpm, alternatively ≥100 rpm is sufficient therefor. An upper limit to mixing speed may be 200 rpm, alternatively ≤150 rpm, alternatively 100 rpm. Super-ambient treating reaction temperatures may allow lower mixing speeds to be used, and sub-ambient reaction temperatures may allow higher mixing speeds to be used. When the endcapping and treating reaction temperatures are ambient temperature (e.g., 25° C.), the endcapping and treating reaction times sufficient to endcap the hydroxyls of the HOE Polymer or achieve homogenous dispersion of the treated silica in the reaction mixture, respectively, may be from 1 minute to 60 minutes. Due to lower mixing efficiencies, manufacturing times may be somewhat longer (e.g., from 10% to 100% longer) than laboratory times. An initial uniform premixture of ingredients (A) and (B) may be rapidly formed, but may lack slump characteristic (a), optical transmission characteristic (b), or both. Upon continued mixing, however, a minimum treating effective time is eventually reached when the uniform premixture of ingredients (A) and (B) is produced with at least slump characteristic (a). The continued mixing may be stopped when visual inspection shows the uniform premixture of (A) and (B) has a desired slump, as determined by periodically sampling the treating reaction mixture and determining slump of the sample, typically ≤30 minutes. With additional mixing past the minimum treating effective time, the characteristic (a), or (a) and (b), may continue to improve until plateauing at a maximum value under the circumstances. Any sequential steps of the method may be performed promptly one right after the other, with minimum delay, for better results regarding characteristic (a) or (a) and (b). Any delay between sequential steps (e.g., mixing steps) may be ≤30 minutes, alternatively ≤5 minutes.

The endcapping and treating reactions independently may proceed at similar reaction temperatures, alternatively at lower or higher temperatures. The temperatures may be varied within limits that are sufficient to prepare the SiOE Polymer and treat the untreated silica in situ, respectively, within a particular desired reaction time. When the endcapping or treating reaction time is desired to be ≤15 minutes, the endcapping or treating reaction temperature may be from 10° C. to 50° C. (e.g., 25° C.).

Typically mechanics of the method comprises mixing ingredients. The mixing may be started with reactants at ambient temperature. Equipment suitable for the mixing is not specifically restricted and may be selected depending on the type and amount of each ingredient selected. Agitated batch kettles may be used for relatively high slump compositions. Alternatively, continuous compounding equipment, e.g., extruders such as twin screw extruders, may be used for preparing lower but still ≥2.5 mm slump compositions and compositions containing relatively high amounts of particulates. General methods are known, e.g., US 2009/0291238; US 2008/0300358.

Each composition may be prepared according to the method of producing same. Alternatively, the second filled silicone composition may be prepared by any other method provided such composition has the aforementioned slump characteristic (a).

Each composition may be prepared as a one part or multiple part composition. The one-part composition may be prepared by combining all ingredients by any convenient means, such as mixing, e.g., as described for the method. All mixing steps or just a final mixing step may be performed under substantially anhydrous conditions, and the resulting composition may be stored under substantially anhydrous conditions, e.g., in a sealed container, under anhydrous atmosphere, or both, until ready for use. The multiple part (e.g., 2 part) composition may be prepared wherein the uniform premixture of ingredients (A) and (B) and the cure catalyst ingredient (C) are stored in separate parts, and the parts are combined (e.g., by mixing) shortly before use of the composition. The uniform premixture of ingredients (A) and (B) part and a catalyst part may be combined in relative amounts of from 1:1 to 10:1. Each composition may comprise a moisture cure package.

Once prepared each composition may be used immediately, e.g., to prepare the cured material or manufactured article. Alternatively, each composition may be stored for any practical period, e.g., ≥1 hour, alternatively ≥1 day, alternatively ≥1 week, alternatively ≥30 days, alternatively ≥300 days, alternatively ≥2 years before use. Each composition may be stored in a container that protects the composition from exposure to a cure trigger (e.g., triggering agent, e.g., water or lower alcohol) or triggering condition (e.g., heat, with or without water release agent). The storage may be at a suitable temperature (e.g., ≤40° C., e.g., 25° C.) and under an anhydrous/alcohol-free condition (e.g., hermetically sealed container, under an inert gas atmosphere (e.g., $N_2$ or Ar gas), or both) such that each composition meets the slump retention characteristic (c), alternatively (c) and at least one of characteristics (b) and (d). Then, when desired, curing (via the condensation reaction) of each composition may be initiated by exposing it to the cure trigger. The curing of each composition to a tack-free surface may occur at 25° C. at a cure speed of less than 2 hours, alternatively less than 1 hour, alternatively less than 20 minutes, alternatively less than 10 minutes, alternatively less than 5 minutes. If desired, curing may be performed at higher or lower temperatures for shorter or longer periods of time.

The cured material may be prepared by contacting the first or second composition with an effective amount of a triggering agent (e.g., quantity of water, methanol, or ethanol sufficient to overcome the dehydrating effect of the moisture scavenger SCS2), triggering effective condition (e.g., heat), or both so as to initiate a condensation reaction, which is catalyzed by the cure catalyst ingredient (C). Exposure to ambient moisture may provide the triggering amount of water. Upon curing, the resulting cured material may form a gum, gel, rubber, or resin. The cured material may be characterized by an initial light transmission >95%, alternatively >98%, alternatively >99%, alternatively >99.5%, all up to 100%, at a thickness of 2.0 millimeters (mm) or less when measured according to ASTM D542-00(2006).

Each composition and cured material independently is useful as the adhesive, alternatively the coating, alternatively the filler, alternatively the sealant. Each cured material may be further characterizable according to AAMA 800-05 as meeting at least one of: weathering (ASTM C794-10, *Standard Test Method for Adhesion-in-Peel of Elastomeric Joint Sealants*); durometer-based hardness (ASTM C661-06(2011), *Standard Test Method for Indentation Hardness of Elastomeric-Type Sealants by Means of a Durometer*); and peel adhesion (ASTM C794-10). The peel adhesion may be determined with the composition or cured material on six aluminum panels and may have at least 90% cohesive failure of ≥0.88 Newton per millimeter (N/mm) of width when tested according to ASTM C794-10 as modified in AMAA 800-05 section 2.4.1 (Test B) prior to, alternatively after, alternatively both prior to and after water immersion.

Each composition and cured material may be readily incorporated onto or into the substrate of the manufactured article. The substrate may be wood, vinyl, fiberglass, aluminum, or glass. The manufactured article may be a building component (e.g., a window or door assembly), automotive, or electronic component. The article may be manufactured by filling a cavity in the substrate with the composition, or by applying the composition to at least an exterior or interior surface portion of the substrate by any suitable means such as by brushing, calendaring, dipping, drawing down, (co)extruding, rolling, spraying, or wiping, to give the article having the first or second composition applied therein or thereon. If desired, the applied composition may then be cured in or on the substrate so as to make the manufactured article having the cured material.

The invention is further illustrated by, and each composition/method may be any combinations of features and limitations of, the non-limiting examples that follow. For instance, the compositions may be one-part compositions having any one of the limitations of any one of the examples.

Equipment used: mixing in Examples 1-14 and 23-28 was done using a 100 g capacity cup and SpeedMixer laboratory mixer (FlackTek Inc., Landrum, S.C., USA). Mixing in Examples 15-22 was done using a 1 quart (950 milliliter (mL)) Ross mixer (Charles Ross & Son Company, Hauppauge, N.Y., USA). Storage container was SEMCO cartridge (PPG Industries, Pittsburgh, Pa., USA).

Reagents used: HOE Polymers: ($\alpha,\Omega$)-dihydroxy-polydimethylsiloxane having a kinematic viscosity of 12,500 cSt (($\alpha,\Omega$)-DH-PDMS$^{12}$) or 55,000 cSt (($\alpha,\Omega$)-DH-PDMS$^{55}$); a ($\alpha,\Omega$)-dihydroxy-polydiethylsiloxane having a kinematic viscosity of 42,000 cSt (($\alpha,\Omega$)-DH-PDES$^{42}$); ingredient (D): ethylenediaminopropyltrimethoxysilane (EDPTS or Z-6094 silane); methacryloxypropyl trimethoxysilane (MAPTS or Z-6030 silane); and Dow Corning™ 200 Fluid (200 Fluid, PDMS) were obtained from Dow Corning. SCS1 & SCS2: methyl tris(methylethylketoximino) silane (MOS) was obtained from Honeywell International, Inc. (as "OS 1000/110 Methyl Oximo Silane"), Morristown, N.J., USA; 80:20 mixture of vinyl tris(methylethylketoximino) silane (VOS)/tetra(methylethylketoximino) silane (TOS); VOS; and a mixture of 15 wt % TOS in MOS (MT15) were obtained from Nitrochemie Aschau GmbH, Aschau am Inn, Germany. Untreated fumed silicas CAB-O-SIL L-90 had surface area of 90 $m^2$/g; CAB-O-SIL LM-150 had surface area of 150 $m^2$/g; and CAB-O-SIL M-7D had surface area of 200 $m^2$/g, and all had from 0.55 wt % to <2.9 wt % free water and were obtained from Cabot Corporation, Boston, Mass., USA. Ingredient (C): dimethyltin dineodecanoate ("DMTDN") was obtained as UL-28 from Momentive, Columbus, Ohio, USA; and dibutyltin dilaurate ("DBTDL") was obtained as FASCAT 4202 from Arkema Inc., Philadelphia, Pa., USA.

Initial mixing started at ambient temperature (about 25° C.-27° C.); heat of mixing may have increased temperature, but no heating was applied unless otherwise noted. Mixing was performed at a mixer speed (rpm) adequate to give a shear rate that was sufficient for preparing the compositions having the aforementioned slump characteristic (a). Flowability of compositions was determined at ambient temperature.

Example (Ex.) 1: (i) Mixed 79.31 g of HOE Polymer (see Table 1 later) with 1.50 g of VOS (SCS1) for 2 times (×) 1 minute (min.). (ii) Promptly added 8.00 g of CAB-O-SIL L-90; and mixed for 2×1 min until fully dispersed to give a silica filled ingredient (A). (iii) Promptly scraped sides of mixer, and then added 2.00 g (SCS2), hand mixed, and then mixed for 2×1 min to give a uniform premixture containing ingredients (A) and (B). (iv) Promptly scraped sides of mixer, and then simultaneously added 0.15 g of DMTDN and 1.65 g of EDPTS, and mixed for 1×1 min. (v) Then promptly packaged in a SEMCO cartridge to give the flowable composition of Ex. 1. The ingredients and wt % and result are listed later in Table 1.

Ex. 2 to 13: replicated Ex. 1 to give flowable compositions of Ex. 2 to 13 except used the ingredients and amounts thereof listed later in Table 1.

Example (Ex.) 14: (i) Mixed 79.31 g of HOE Polymer (see Table 1 later) with 1.50 g of a 1:1 mixture (SCS1) of 0.75 g MT15 and 0.75 g VOS for 5 minutes (min) at 35 revolutions per minute (rpm). (ii) Promptly added 10.00 g of CAB-O-SIL L-90; and mixed for 10 min at 70 rpm until fully dispersed to give ingredient (A) and silica. (iii) Promptly scraped sides of mixer, then added 3.0 g MT15 (SCS2), and mixed for 10 min at 70 rpm to give a uniform premixture containing ingredients (A) and (B). (iv) Promptly scraped sides of mixer, and then simultaneously added 0.15 g of DMTDN and 0.60 g of EDPTS, and mixed for 10 min at 50 rpm. (v) Then, to remove trapped air, promptly mixed for 10 min at 35 rpm under full vacuum to give the deaired composition. (vi) Then promptly packaged in SEMCO cartridge and centrifuged to give the flowable composition of Ex. 14. The ingredients and wt % are listed later in Table 1. With aliquots of the stored composition, measured the slump in mm by the AAMA modified ASTM D2202-00(2010), and measured tack-free time (TFT) in minutes (min.) by ASTM D2377-00(2008), and observed the results shown below in Table 1.

Ex. 15 to 21: replicated Ex. 14 to give the flowable compositions of Ex. 15 to 21 except used the ingredients and amounts thereof listed later in Table 1 and obtained the tack-free time results and slump except the time of slump measurement was as listed later in Table 1.

Ex. 22: (i) Mixed 79.31 g of HOE Polymer (see Table 1 later) with 10.00 g CAB-O-SIL L-90 (1.161 wt % free water) for 4 times 30 seconds (sec) until fully dispersed. (ii) Promptly scraped sides of container. Then added 1:1 mixture of 2.01 g of VOS and 2.04 g MOS (SCS1 and SCS2), and mixed for 2×1 min. to give a uniform premixture of ingredients (A) and (B). (iii) Promptly scraped sides of container, and then simultaneously added 0.15 g of cure catalyst (DMTDN or DBTDL, ingredient (C)) and 1.65 g of ethylenediaminopropyltrimethoxysilane (EDPTS, ingredient (D)), and mixed for 2×30 sec (iv) Promptly packaged in a SEMCO cartridge to give the flowable composition of Ex. 22. The ingredients and wt % and result are listed later in Table 1.

Ex. 23 to 25: replicated Ex. 22 to give the flowable compositions of Ex. 23 to 25 except used the ingredients and amounts thereof to give the wt % listed later in Table 1.

Ex. 26 and 27: Ex. 26: Replicated Ex. 22 to give the flowable composition of Ex. 26 except used the ingredients and amounts thereof to give the wt % listed later in Table 1; in step (iii) added 15.00 g Dow Corning™ 200 Fluid and mixed 4×30 sec, before the ingredients (C) and (D) were added. Ex. 27: Replicated Ex. 26 to give the flowable composition of Ex. 27 except used 30% more MOS and 30% more VOS as indicated below in Table 1. Ex. 26 and 27 show adding SCS1 and SCS2 to DH-PDMS[55] in absence of silica gives flowable compositions.

Ex. 28: (i) Mixed 79.31 g of HOE Polymer (see Table 1 later) with 1.50 g VOS (SCS1) for 4 times 1 min until fully dispersed. (ii) Added 8.00 g CAB-O-SIL L-90, and mixed 2×1 min (iii) Promptly scraped sides of container. Then added 80:20 mixture of 2.00 g of MOS and 0.54 g VOS (SCS2), and mixed for 2×1 min to give a uniform premixture of ingredients (A) and (B). (iv) Promptly scraped sides of container, and then simultaneously added 0.15 g of cure catalyst (DMTDN or DBTDL, ingredient (C)) and 1.65 g of ethylenediaminopropyltrimethoxysilane (EDPTS, ingredient (D)), and mixed for 2×1 min (v) Promptly packaged in a SEMCO cartridge to give the flowable composition of Ex. 32. The ingredients and wt % and result are listed later in Table 1.

Ex. 29 Replicate the procedure of Ex. 22, except use DH-PDMS[55] instead of DH-PDMS[12], use M-7D instead of L-90, and use the amounts of DH-PDMS[55], VOS, M-7D, MOS, EDPTS, and DMTDN shown in Table 1 for Ex. 29, to give the flowable composition of Ex 29.

Ex. 30: Replicate the procedure of Ex. 1, except use M-7D instead of L-90, and use the amounts of DH-PDMS[12], VOS, M-7D, MOS, EDPTS, and DMTDN shown in Table 1 for Ex. 31, to give the flowable composition of Ex 31.

TABLE 1 characterization of compositions of Ex. 1 to 30.

| Ex. No. | HOE Polymer (wt %) | SCS1 (wt %) | CAB-O-SIL UTF silica (wt %) | SCS2 (wt %) | Adhes. Promot. (wt %) | Catalyst (wt %) | TFT Yield[a] in (g) min | Slump in mm after time (min) |
|---|---|---|---|---|---|---|---|---|
| 1 | DH-PDMS[12] (85.64) | VOS (1.62) | L-90 (8.64) | MOS (2.16) | EDPTS (1.78) | DMTDN (0.16) | 92.6 N/t[b] | Flowable[c,d]; 101 mm (1.56 min) |
| 2 | DH-PDMS[12] | VOS (1.63) | L-90 (8.70) | MOS (2.17) | EDPTS (1.09) | DMTDN (0.16) | 91.7 N/t | Flowable[c,d]; |

TABLE 1-continued characterization of compositions of Ex. 1 to 30.

| Ex. No. | HOE Polymer (wt %) | SCS1 (wt %) | CAB-O-SIL UTF silica (wt %) | SCS2 (wt %) | Adhes. Promot. (wt %) | Catalyst (wt %) | Yield[a] (g) | TFT in min | Slump in mm after time (min) |
|---|---|---|---|---|---|---|---|---|---|
| | (86.24) | | | | | | | | 101 mm (1.07 min) |
| 3 | DH-PDMS[12] (86.62) | VOS (1.64) | L-90 (8.74) | MOS (2.18) | EDPTS (0.66) | DMTDN (0.16) | 91.6 | N/t | Flow-able[c,d]; 101 mm (1.49 min) |
| 4 | DH-PDMS[12] (86.13) | VOS (1.63) | L-90 (8.69) | MOS (2.17) | EDPTS (1.21) | DMTDN (0.16) | 92.1 | N/t | Flow-able[c,d]; 101 mm (1.38 min) |
| 5 | DH-PDMS[12] (86.55) | VOS (1.64) | L-90 (8.73) | MOS (2.18) | EDPTS (0.73) | DMTDN (0.16) | 91.6 | N/t | Flow-able[c,d]; 101 mm (3.07 min) |
| 6 | DH-PDMS[12] (84.72) | VOS (1.60) | L-90 (8.55) | MOS (3.20) | EDPTS (1.77) | DMTDN (0.16) | 93.6 | N/t | Flow-able[c,d]; 101 mm (3.13 min)[d1] |
| 7 | DH-PDMS[12] (85.32) | VOS (1.61) | L-90 (8.61) | MOS (3.23) | EDPTS (1.08) | DMTDN (0.16) | 93.0 | N/t | Flow-able[c,d]; 101 mm (3.86 min)[d1] |
| 8 | DH-PDMS[12] (85.68) | VOS (1.08) | L-90 (8.64) | MOS (3.78) | EDPTS (0.65) | DMTDN (0.16) | 92.6 | N/t | Flow-able[c,d]; 101 mm (4.89 min)[d1] |
| 9 | DH-PDMS[12] (85.21) | VOS (1.61) | L-90 (8.60) | MOS (3.22) | EDPTS (1.20) | DMTDN (0.16) | 93.1 | N/t | Flow-able[c,d]; 101 mm (3.24 min)[d1] |
| 10 | DH-PDMS[12] (85.62) | VOS (1.62) | L-90 (8.64) | MOS (3.24) | EDPTS (0.72) | DMTDN (0.16) | 92.6 | N/t | Flow-able[c,d]; 101 mm (2.98 min)[d1] |
| 11 | DH-PDMS[12] (85.32) | 4:1 VOS/TOS (1.61) | L-90 (8.61) | MOS (3.23) | EDPTS (1.08) | DMTDN (0.16) | 93.0 | N/t | Flow-able[c,d]; 101 mm (1.98 min)[d1] |
| 12 | DH-PDMS[12] (85.32) | 4:1 VOS/TOS (1.61) | L-90 (8.61) | MT15 (3.23) | EDPTS (1.08) | DMTDN (0.16) | 93.0 | N/t | Flow-able[c,d]; 101 mm (4.44 min)[d1] |
| 13[e] | DH-PDES[42] (85.32) | VOS (1.61) | L-90 (8.61) | MOS (3.23) | EDPTS (1.08) | DMTDN (0.16) | 93.0 | N/t | Flow-able[c,d]; 101 mm (1.1 min)[d1] |
| 14 | DH-PDMS[12] (83.87) | 1:1 MT15/VOS (1.58) | L-90 (10.58) | MT15 (3.17) | EDPTS (0.63) | DMTDN (0.16) | 94.6 | 28 | ≥101 mm (5 min)[d] |
| 15 | DH-PDMS[12] (86.62) | 1:1 MT15/VOS (1.64) | LM-150 (7.65) | MT15 (3.28) | EDPTS (0.66) | DMTDN (0.16) | 91.6 | 28 | ≥101 mm (7 min)[d] |
| 16 | DH-PDMS[12] (83.87) | VOS (1.59) | L-90 (10.58) | MT15 (3.17) | EDPTS (0.63) | DMTDN (0.16) | 94.6 | 26 | ≥101 mm (6 min)[d] |
| 17 | DH-PDMS[12] (86.62) | VOS (1.64) | LM-150[f] (7.65) | MOS (3.28) | EDPTS (0.66) | DMTDN (0.16) | 91.6 | 32 | ≥101 mm (9 min)[d] |

TABLE 1-continued characterization of compositions of Ex. 1 to 30.

| Ex. No. | HOE Polymer (wt %) | SCS1 (wt %) | CAB-O-SIL UTF silica (wt %) | SCS2 (wt %) | Adhes. Promot. (wt %) | Catalyst (wt %) | Yield[a] (g) | TFT in min | Slump in mm after time (min) |
|---|---|---|---|---|---|---|---|---|---|
| 18 | DH-PDMS[12] (85.68) | VOS (1.62) | L-90 (7.65) | MOS (3.28) | EDPTS (0.66) | DMTDN (0.16) | 92.6 | 29 | ≥101 mm (2 min)[d] |
| 19 | DH-PDMS[12] (87.58) | VOS (1.66) | L-90 (6.63) | MOS (3.31) | EDPTS (0.66) | DMTDN (0.17) | 90.6 | 28 | ≥101 mm (2 min) |
| 20 | DH-PDMS[12] (85.68) | 4:1 VOS/TOS (1.62) | L-90 (8.64) | MOS (3.24) | EDPTS (0.65) | DMTDN (0.16) | 92.6 | 27 | ≥101 mm (6 min) |
| 21 | DH-PDMS[12] (85.56) | 4:1 VOS/TOS (1.62) | L-90 (8.63) | MOS (3.24) | EDPTS (0.43) & MAPTS (0.36) | DMTDN (0.16) | 92.7 | 26 | ≥101 mm (2 min) |
| 22 | DH-PDMS[12] (82.48) | 1:1 VOS/MOS (4.21) | L-90[g] (10.40) | See[h] | EDPTS (1.72) | DMTDN (0.16) | 96.2 | N/t | Flowable; 101 mm (0.97 min)[h1] |
| 23 | DH-PDMS[12] (82.48) | 2:3 VOS/MOS (5.25) | L-90 (10.40) | See[h] | EDPTS (1.72) | DMTDN (0.16) | 96.2 | N/t | Flowable[c] |
| 24 | DH-PDMS[12] (83.46) | 1:1 VOS/MOS (4.23) | L-90 (10.43) | See[h] | EDPTS (1.72) | DMTDN (0.16) | 95.9 | N/t | Flowable[c] |
| 25 | DH-PDMS[12] (84.23) | 2:3 VOS/MOS (5.36) | L-90 (8.50) | See[h] | EDPTS (1.75) | DMTDN (0.16) | 94.2 | N/t | Flowable[c] |
| 26[i] | DH-PDMS[55] (71.68) | 1:1 VOS/MOS (2.88) | M-7D (8.74) | See[h] | EDPTS (1.17) | DBTDL (0.12) | 97.3 | N/t | Flowable[c] |
| 27[j] | DH-PDMS[55] (70.81) | 1:1 VOS/MOS (4.06) | M-7D (8.63) | See[h] | EDPTS (1.16) | DBTDL (0.12) | 98.5 | N/t | (k) |
| 28 | DH-PDMS[12] (85.14) | VOS (1.61) | L-90 (8.59) | 4:1 MOS/VOS (2.73) | EDPTS (1.77) | DMTDN (0.16) | 93.2 | N/t | Flowable[c] |
| 29 | DH-PDMS[55] (86.45) | VOS (1.65)/MOS (2.80) | M-7D[l] (8.00) | See[h] | EDPTS (0.90) | DMTDN (0.20) | 100 | N/t | >2.5 mm (5 min) and 40.6 mm (7 min) |
| 30 | DH-PDMS[12] (86.55) | VOS (1.64) | M-7D (8.73) | MOS (2.18) | EDPTS (0.73) | DMTDN (0.16) | 96.2 | N/t | Flowable[c] |

[a]composition total weight, grams;
[b]not tested;
[c]"flowable" means the composition was allowed to cool, if necessary, to 25° C., and visually/qualitatively had slump >3 mm immediately and visually/qualitatively had retained slump ≥2.5 mm at 5 minutes after sealed storage at 25° C. for 3 days;
[d]retained slump >3 mm after sealed storage at 25° C. for 60 days;
[d1]Ex. 1 to 13 were replicated and quantitative slump data were obtained when tested as described in ASTM D2202-00(2010) except temperature was 25° C. and the time in minutes was recorded when slump reached 101.6 mm (recited as "101" mm in Table 1);
[e]Ex. 13 was optically clear to naked eye;
[f]CABO-SIL LM-150 had 1.540 wt % free water by ASTM-D280-01(2007);
[g]CAB-O-SIL L-90 had 1.161 wt % free water;
[h]SCS2 included in SCS1 column;
[h1]Ex. 22 was replicated and quantitative slump data were obtained when tested as described in ASTM D2202-00(2010) except temperature was 25° C. and the time in minutes was recorded when slump reached 101.6 mm (recited as "101" mm in Table 1);
[i]contained 15.42 wt % of 200 Fluid;
[j]contained 15.23 wt % of 200 Fluid;
[k]uniform premixture of ingredients (A) an (B) was flowable after step (b). Ex. 27 composition was more flowable than Dow Corning ™ 1199 Silicone Glazing Sealant (ASTM D 2202 Flow/Sag (Slump) <5.1 mm reported in Dow Corning ™ Product Information Ref. No. 62-586E-01, 2010 Dec. 20);
[l]CAB-O-SIL M-7D used in Ex. 29 had 2.071 wt % free water.

Ex. A1 to A8: Applied each composition of Ex. 14 to 21, respectively, on a different substrate that was glass, anodized aluminum, or KYNAR polyvinylidene fluoride (DURANAR SUNSTORM) coated aluminum (PPG Industries) to give 3 substrate samples of each composition. Allowed samples to cure for 7 days at room temperature, then determined 1.27 centimeter-wide peel adhesion (strength) with ASTM C794-10 test, 2 tests per sample, total of 6 tests per composition per substrate. The 6 test results are summarized as the range from the lowest to highest test results below in Table 2.

TABLE 2

Peel adhesion of compositions of Ex. 14 to 21.

| Ex. No. | Comp. Ex. | Substrate | Peel Adhesion in pound force/inch (n = 6 range, lbf/in) | Peel Adhesion in Newtons/meter (N/m) |
| --- | --- | --- | --- | --- |
| A1 | Ex. 14 | Glass | 11-22 | 1900-3800 |
| | | anodized Al | 18-23 | 3200-4000 |
| | | F Polymer | 10-23 | 1800-4000 |
| A2 | Ex. 15 | Glass | 10-15 | 1800-2700 |
| | | anodized Al | 12-17 | 2100-3000 |
| | | F Polymer | 8-18 | 1400-3200 |
| A3 | Ex. 16 | Glass | 14-23 | 2500-4000 |
| | | anodized Al | 6-14 | 1100-2500 |
| | | F Polymer | 13-18 | 2300-3200 |
| A4 | Ex. 17 | Glass | 6-11 | 1100-1900 |
| | | anodized Al | 5-12 | 880-2100 |
| | | F Polymer | 6-9 | 1100-1600 |
| A5 | Ex. 18 | Glass | 6-10 | 1100-1800 |
| | | anodized Al | 6-11 | 1100-1900 |
| | | F Polymer | 8-13 | 1400-2300 |
| A6 | Ex. 19 | Glass | 4-7 | 700-1200 |
| | | anodized Al | 5-7 | 880-1200 |
| | | F Polymer | 5-7 | 880-1200 |
| A7 | Ex. 20 | Glass | 6-12 | 1100-2100 |
| | | anodized Al | 6-12 | 1100-2100 |
| | | F Polymer | 8-10 | 1400-1800 |
| A8 | Ex. 21 | Glass | 5-9 | 880-1600 |
| | | anodized Al | 6-13 | 1100-2300 |
| | | F Polymer | 5-8 | 880-1400 |

Ex. B1 to B4: Prepared 100 mils (2.54 mm) thick slabs of the compositions of Ex. 22 to 25 on polyethylene sheets, exposed the slabs to ambient air, and observed curing to cured coatings of Ex. B1 to B4, which sealed the coated portions of the sheets.

The Examples show that the method produces the filled siloxane composition lacking a fluidizer in its fundamental form and yet having slump characteristic (a). At least some Examples showed tack-free time characteristic (d) and one Example showed characteristic (b). With proper storage, the compositions are expected to also have retention of slump characteristic (c). The Examples show that the compositions are useful as adhesives, coatings, fillers, and sealants. Each composition advantageously may be used to overcome the fluidizer-related weakening, cracking, and bleeding defects of fluidizer-containing prior art compositions.

Comparative Ex. 1: Replicated Ex. 22 except added the 4.21 wt % MOS/VOS to DH-PDMS[12], and added the L-90 silica after endcapping. Composition was non-flowable. Similar experiment with 5.1 wt % 3:2 MOS/VOS/12.1 g M7D silica initially produced flowable, clear composition that stiffened after it was stored 3 to 5 days.

What is claimed is:

1. A filled silicone composition comprising a mixture of ingredients (A), (B), and (C): (A) endcapping reaction products comprising a silyloxy-endcapped polydiorganosiloxane (SiOE Polymer) and a moisture scavenging effective amount of a first self-catalytic silane (SCS1), which ingredient (A) has been prepared by reaction of a hydroxyl-endblocked polydiorganosiloxane having a kinematic viscosity of from 10,000 Centistokes (cSt) to 100,000 cSt (HOE Polymer) and an endcapping/scavenging effective amount of the SCS1; (B) treating reaction products comprising a silane-treated silica and a moisture scavenging effective amount of a second self-catalytic silane (SCS2), which ingredient (B) has been prepared by reaction of an untreated silica, an activating effective amount of water, and a treating/scavenging effective amount of the SCS2; and (C) a catalytically effective amount of a cure catalyst; wherein ingredients (A) and (B) have been premixed to give a uniform premixture of ingredients (A) and (B), and then ingredient (C) has been added to the uniform premixture of ingredients (A) and (B) so as to prepare the mixture of ingredients (A) to (C); wherein the composition initially has characteristic (a): a slump of ≥2.5 millimeters (mm) when tested as described in ASTM D2202-00(2010) except temperature shall be 25 degrees Celsius (° C.) and time shall be 5 minutes, wherein the amount of the activating effective amount of water is from 0.55 to <2.9 wt % based on the total weight ingredients (A), (B) and (C) in the composition, and wherein the combined amount of the activating effective amount of water plus the untreated silica is from 1 to 20 wt % based on the total weight ingredients (A), (B) and (C) in the composition.

2. The composition as in claim 1, wherein the SCS1 is a ($C_2$-$C_4$)alkenyl tri(ketoximino)silane, tetra(ketoximino)silane, or a mixture thereof; and the SCS2 is a ($C_2$-$C_4$)alkenyl tri(ketoximino)silane, tetra(ketoximino)silane, alkyltri(ketoximino)silane, alkyltri(alkyllactate)silane, ($C_2$-$C_4$)alkenyl tri(alkyllactate)silane, tetra(alkyllactate)silane, or a mixture of any two or more thereof; wherein each ketoximino is based on a dimethylketone, methyl ethyl ketone, or diethylketone.

3. The composition as in claim 1, further comprising ingredient (D): an adhesion promoter.

4. The composition as in claim 1, wherein the composition lacks an added ingredient that is a fluidizer having a kinematic viscosity>0 cSt and <10,000 cSt.

5. The composition as in claim 1, wherein the SiOE Polymer is a silyloxy-endblocked polydialkylsiloxane.

6. The composition as in claim 1, further having characteristic (b), (c), or (d): (b) an initial light transmission greater than 95% at a thickness of 2.0 millimeters (mm) or less when measured according to ASTM D542-00(2006); (c): after storage of the composition at 25 degrees Celsius under an anhydrous/alcohol-free condition for ≥30 days, a retention of the slump of ≥2.5 millimeters when tested as described in ASTM D2202-00(2010) except temperature shall be 25 degrees Celsius and time shall be 5 minutes; or (d) a cure speed of ≤40 minutes when tested according to ASTM C679-03(2009)e1 or a tack-free time of ≤40 minutes when tested according to ASTM D2377-00(2008).

7. A cured material prepared by curing the composition of claim 1.

8. A manufactured article comprising a substrate and the cured material of claim 7 in operative contact therewith.

9. A manufactured article comprising a substrate and the composition of claim 1 in operative contact therewith.

10. The composition of claim 1, which has been prepared starting from ingredients that consist essentially of the unreacted HOE Polymer, SCS1, SCS2, untreated fumed silica having the activating effective amount of water, adhesion promoter, catalyst, and optionally a fluidizer.

11. A filled silicone composition consisting essentially of a mixture of ingredients (A), (B), and (C): (A) a silyloxy-endcapped polydiorganosiloxane (SiOE Polymer) and a moisture scavenging effective amount of a first self-catalytic silane (SCS1); (B) silane-treated silica and a moisture scavenging effective amount of a second self-catalytic silane (SCS2); and (C) a catalytically effective amount of a cure catalyst; wherein ingredients (A) and (B) have been premixed to give a uniform premixture of ingredients (A) and (B), and then ingredient (C) has been added to the uniform premixture so as to prepare a mixture of ingredients (A) to (C); and wherein the composition has characteristic (a): a slump of ≥2.5 millimeters (mm) when tested as described in ASTM D2202-00(2010) except temperature shall be 25 degrees Celsius (° C.) and time shall be 5 minutes, wherein the amount of the activating effective amount of water is from 0.55 to <2.9 wt % based on the total weight ingredients (A), (B) and (C) in the composition, and wherein the combined amount of the activating effective amount of water plus the untreated silica is from 1 to 20 wt % based on the total weight ingredients (A), (B) and (C) in the composition.

12. The composition as in claim 11, consisting essentially of ingredient (D): an adhesion promoter.

13. The composition as in claim 11, wherein the SiOE Polymer is a silyloxy-endblocked polydialkylsiloxane.

14. The composition as in claim 11, further having characteristic (b), (c), or (d): (b) an initial light transmission greater than 95% at a thickness of 2.0 millimeters (mm) or less when measured according to ASTM D542-00(2006); (c): after storage of the composition at 25 degrees Celsius under an anhydrous/alcohol-free condition for ≥30 days, a retention of the slump of ≥2.5 millimeters when tested as described in ASTM D2202-00(2010) except temperature shall be 25 degrees Celsius and time shall be 5 minutes; or (d) a cure speed of ≤40 minutes when tested according to ASTM C679-03(2009)e1 or (d) a tack-free time of ≤40 minutes when tested according to ASTM D2377-00(2008).

15. A method of producing a filled silicone composition comprising a mixture of ingredients (A), (B), and (C): (A) endcapping reaction products comprising a silyloxy-endcapped polydiorganosiloxane (SiOE Polymer) and a moisture scavenging effective amount of a first self-catalytic silane (SCS1); (B) treating reaction products comprising a silane-treated silica and a moisture scavenging effective amount of a second self-catalytic silane (SCS2); and (C) a catalytically effective amount of a cure catalyst; wherein the composition initially has characteristic (a): a slump of ≥2.5 millimeters (mm) when tested as described in ASTM D2202-00(2010) except temperature shall be 25 degrees Celsius (° C.) and time shall be 5 minutes, wherein the amount of the activating effective amount of water is from 0.55 to <2.9 wt % based on the total weight ingredients (A), (B) and (C) in the composition, and wherein the combined amount of the activating effective amount of water plus the untreated silica is from 1 to 20 wt % based on the total weight ingredients (A), (B) and (C) in the composition, the method comprising:

contacting under endcapping effective conditions a hydroxyl-endblocked polydiorganosiloxane having a kinematic viscosity of from 10,000 Centistokes (cSt) to 100,000 cSt (HOE Polymer) with an endcapping/scavenging effective amount of the SCS1 so as to give the ingredient (A);

contacting under treating effective conditions an untreated silica with a treating/scavenging effective amount of the SCS2 and an activating effective amount of water ($H_2O$) so as to give the ingredient (B);

contacting the ingredient (A) with ingredient (B) so as to give a uniform premixture of ingredients (A) and (B); and contacting the uniform premixture of ingredients (A) and (B) with the cure catalyst ingredient (C) so as to give the composition.

16. The method as in claim 15, wherein the uniform premixture of ingredients (A) and (B) is prepared by a method comprising the procedure (bb): (i) contacting the endcapping/scavenging effective amount of the SCS1 with the HOE Polymer to give a mixture comprising ingredient (A); followed by (ii) contacting the treating/scavenging effective amount of the SCS2 to the mixture of (bb)(i); followed by (iii) adding the untreated silica and the activating effective amount of $H_2O$ to the mixture of (bb)(ii) to give the uniform premixture of ingredients (A) and (B).

17. The method as in claim 15, wherein the uniform premixture of ingredients (A) and (B) is prepared by a method comprising the procedure (cc): (i) contacting the endcapping/scavenging effective amount of the SCS1 with the HOE Polymer to give a mixture comprising ingredient (A); followed by (ii) contacting the untreated silica and the activating effective amount of $H_2O$ to the mixture of (cc)(i); followed by (iii) adding the treating/scavenging effective amount of the SCS2 to the mixture of (cc)(ii) to give the uniform premixture of ingredients (A) and (B).

\* \* \* \* \*